United States Patent [19]
Blatt et al.

[11] Patent Number: 5,299,847
[45] Date of Patent: Apr. 5, 1994

[54] GRIPPER ASSEMBLY

[75] Inventors: John A. Blatt, 22 Stratton Pl., Grosse Pointe Shores, Mich. 48236; David C. Tomlin, Mt. Clemens, Mich.

[73] Assignee: John A. Blatt, Grosse Pointe Woods, Mich.

[21] Appl. No.: 645,140

[22] Filed: Jan. 24, 1991

Related U.S. Application Data

[63] Continuation-in-part of Ser. No. 563,253, Aug. 6, 1990.

[51] Int. Cl.⁵ .......................................... B25J 15/00
[52] U.S. Cl. .................................... 294/88; 294/86.41
[58] Field of Search ............................. 294/88, 86.41

[56] References Cited

U.S. PATENT DOCUMENTS

| | | | |
|---|---|---|---|
| 229,670 | 7/1880 | Carrick . | |
| 1,468,110 | 9/1923 | Howe . | |
| 1,929,361 | 10/1933 | Liljebladh | 271/27 |
| 2,212,156 | 8/1940 | Erdley | 24/81 |
| 2,295,051 | 9/1942 | Roth | 24/81 |
| 2,381,657 | 8/1945 | Eksergian et al. | 294/88 |
| 2,452,406 | 10/1948 | Volkery | 24/81 |
| 2,469,542 | 5/1949 | Becker | 24/81 |
| 2,565,793 | 8/1951 | Weismantel | 248/362 |
| 2,651,026 | 9/1953 | Roth | 339/246 |
| 2,791,623 | 5/1957 | Lock et al. | 174/94 |
| 2,858,522 | 10/1958 | Wengen et al. | 339/264 |
| 3,146,982 | 9/1964 | Budnick | 248/68 |
| 3,349,927 | 10/1967 | Blatt | 214/1 |
| 3,350,132 | 10/1967 | Ashton | 294/88 |
| 3,568,959 | 3/1971 | Blatt | 294/64 |
| 3,613,904 | 10/1971 | Blatt | 214/1 BV |
| 3,635,514 | 1/1972 | Blatt | 294/88 X |
| 3,677,584 | 7/1972 | Short | 287/49 |
| 3,712,415 | 1/1973 | Blatt | 181/60 |
| 4,275,872 | 6/1981 | Mullis | 269/72 |
| 4,355,922 | 10/1982 | Sato | 403/385 |
| 4,453,755 | 6/1984 | Blatt | 294/64 A |
| 4,473,249 | 9/1984 | Valentine et al. | 294/88 |
| 4,480,497 | 11/1984 | Locher | 74/531 |
| 4,495,834 | 1/1985 | Bauer et al. | 74/493 |
| 4,596,415 | 6/1986 | Blatt | 294/88 |
| 4,708,297 | 11/1987 | Boers | 242/7.05 B |

*Primary Examiner*—Joseph D. Pape
*Attorney, Agent, or Firm*—Basile and Hanlon

[57] ABSTRACT

A gripper assembly for gripping a workpiece having removable and replaceable mountings. A gripper assembly is substantially square-shaped and has a corresponding square-shaped mounting spacer. The mounting spacer may be positioned about any side of the gripper assembly. This allows an operator to locate the assembly in any orientation to a workpiece assembly unit. The mounting is also removable and replaceable with other mounting configurations as desired. Several mounting couplings may be provided on the gripper to restrict or enlarge movement of the gripper about a workpiece holder assembly.

19 Claims, 3 Drawing Sheets

GRIPPER ASSEMBLY

This application is a continuation-in-part of the co-pending application having the Ser. No. 07/563,253 to Blatt et al. filed Aug. 6, 1990 pending.

BACKGROUND OF THE INVENTION

I. Field of the Invention

The present invention relates to a gripper assembly. More particularly, the present invention relates to a gripper assembly for gripping a workpiece for use with a workpiece holder wherein the gripper assembly comprises a multi-directional mounting member readily removable from the gripper assembly.

II. Description of the Prior Art

Typically, a gripper assembly for use with a workpiece holding device comprises a fluid operating portion and a workpiece gripper portion. The gripper assembly is mounted to the workpiece holder by means such as a ball and socket coupling. A gripper assembly of the general type with which the present invention is concerned is disclosed in U.S. patent application Ser. No. 07/563,253. The device disclosed in that patent includes a gripper assembly having a ball permanently mounted to the gripper for mounting the gripper assembly to the workpiece holder device.

A disadvantage of this type of assembly is that the mount is permanently affixed to the gripper assembly. Therefore, if the gripper assembly needs to be limited in movement and, as such, mounted to the workpiece holder by a different coupling, the gripper assembly must be removed and replaced by a whole new gripper assembly.

Further, if a different workpiece gripper is called for, the workpiece gripper portion of the gripper assembly may not be removed and replaced. Instead, a whole new gripper assembly with its corresponding mount and gripper portion must be provided. This can be costly and time-consuming as replacement of the gripper assembly requires a temporary shutdown of a conveyor system in which it is being used.

SUMMARY OF THE INVENTION

The present invention provides for a gripper assembly which overcomes the disadvantages of the previously known gripper assemblies.

The gripper assembly of the present invention is formed of multi-piece construction. In particular, the gripper assembly is comprised of a fluid operated actuator portion, a workpiece gripper portion and a removable mounting spacer provided therebetween.

In the preferred embodiment, the gripper assembly is substantially square shaped about its end profile. The mounting spacer, complete with its mounting coupling affixed thereto, can then be positioned on any side of the gripper assembly if necessary.

The gripper assembly is equipped with removable threaded bolts for removing the fluid operated actuator portion and the mounting spacer from the workpiece gripper portion. This allows an operator to remove or relocate the mounting spacer about the gripper assembly.

Several mounting couplings may be provided on the gripper to restrict or enlarge movement of the gripper about the workpiece holder assembly.

Other advantages and features of the present invention will become more apparent from the following detailed description when read in conjunction with the accompanying drawings.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENTS

Figure 1:
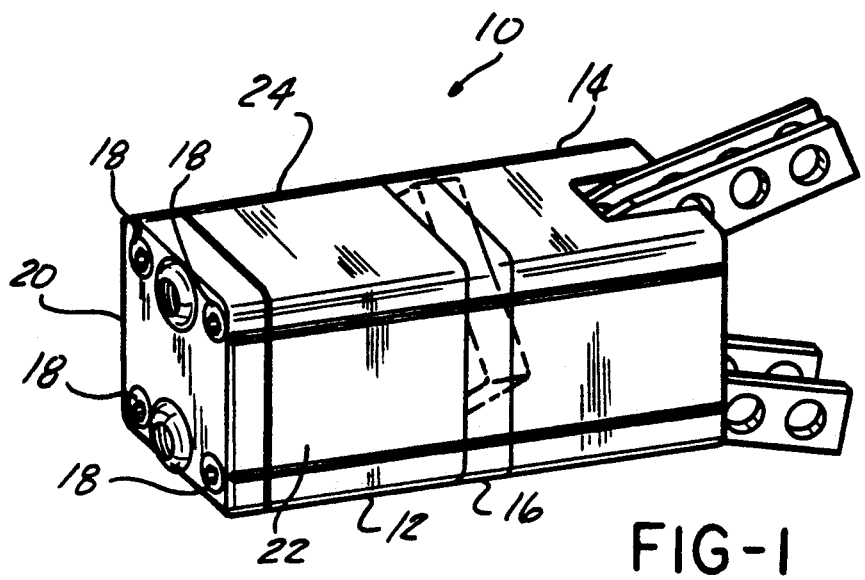
FIG. 1 is a perspective view of the gripper assembly embodying the present invention.

With reference first to FIG. 1, a gripper unit assembly embodying the present invention is there shown generally at 10. Gripper 10 comprises a fluid operated actuator portion 12 at one end and a workpiece gripper portion 14 at its opposite end. A mounting spacer 16 is provided between the actuator portion 12 and the gripper portion 14.

Spacer 16 is substantially rectangular-shaped and has an aperture 6 disposed therethrough (FIG. 5) for passage of a driven member 8, such as a piston, from the actuator portion the gripper portion 14.

The gripper assembly 10 is equipped with bolts 18 which extend from the bottom 20 of the fluid actuator portion 12 through the mounting spacer 16 and into the workpiece gripper portion 14. Bolts 18 connect the multi-piece gripper assembly 10 and may be unscrewed from their position to release each piece from the assembly 10.

Gripper assembly 10 and mounting spacer 16 are substantially square shaped. Therefore, mounting spacer 16 may be oriented to any side 22, 24 of the gripper assembly 10.

Figure 2:
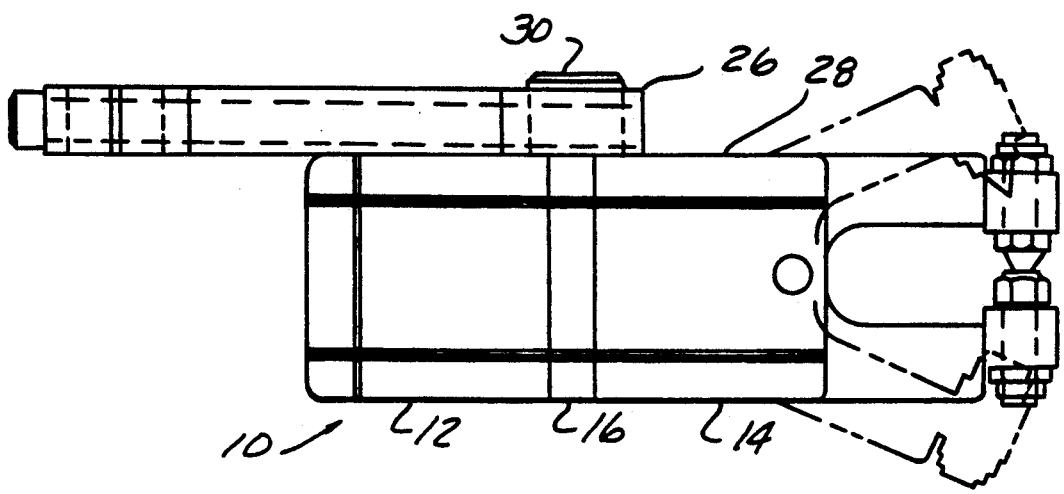
FIG. 2 is a side elevational view showing a first preferred mounting system on the gripper assembly embodying the present invention.
Figure 3:
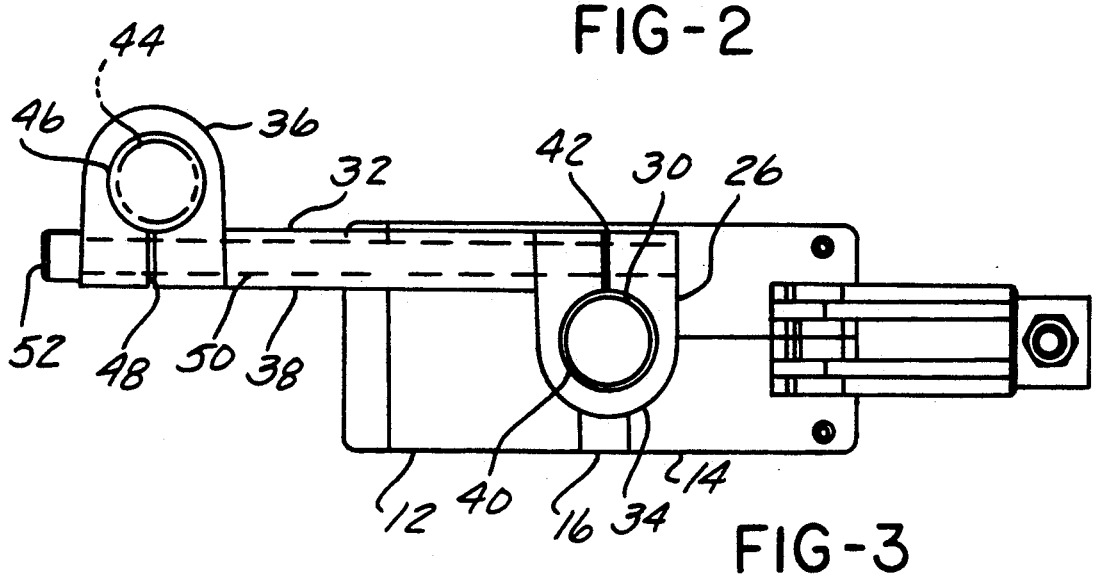
FIG. 3 is a top plan view of the structure shown in FIG. 1.
Figure 4:
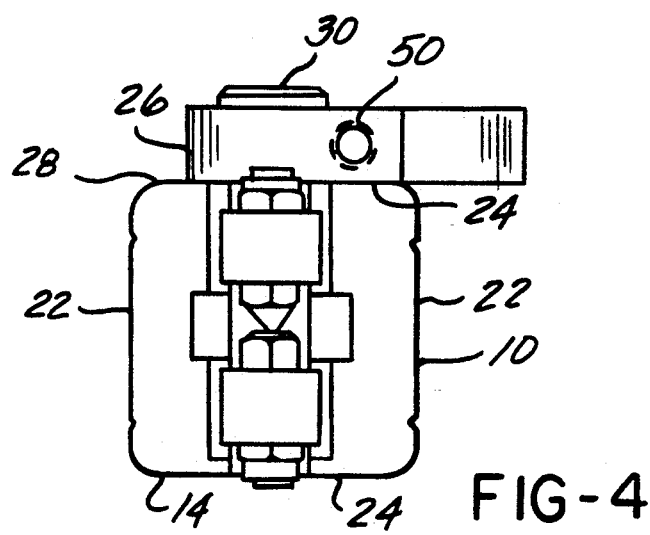
FIG. 4 is a rear plan view of the structure shown in FIG. 1.
Figure 6:
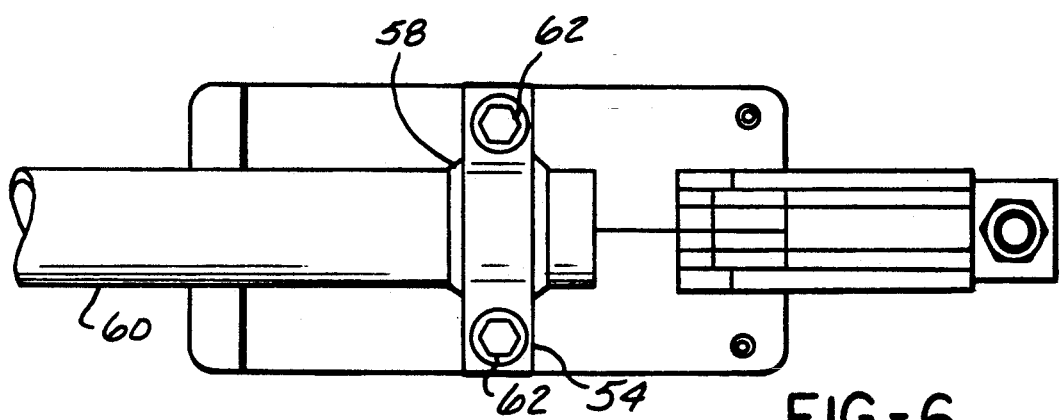
FIG. 6 is a top plan view of the structure shown in FIG. 5.

With reference now to the FIGS. 2 through 4, a first preferred embodiment of a mounting spacer is there shown. FIG. 2 shows a gripper assembly 10 having a mounting spacer 16 with its coupling means 26 oriented o top 28 of the gripper assembly 10. Coupling means 26 provides multi-directional rotation of the gripper means 10 about a workpiece holder.

With reference now to FIG. 3, coupling means 26 is there shown comprising a cylinder 30 fixedly attached to and extending from mounting spacer 16. An S-shaped bracket 32 extends from the gripper assembly 10 to a workpiece holder. Bracket 32 has opposing arms 34, 36 and a central leg 38 extending between these arms 34, 36.

Arm 34 is adapted to be received by cylinder 30 through aperture 40. Cut-away slot 42 is provided in arm 34 and extends from aperture 40 to allow for the adjustment of the aperture's opening.

Arm 36 receives corresponding cylinder 44 fixedly attached to a workpiece holder. Arm 36 is provided with a central aperture 46 and a slot 48 for adjusting the arm 36 about cylinder 44.

An elongated aperture 50 extends the length of central leg 38 and provides for a bolt 52 or any relevant connecting means which may be used to secure the bracket 32 between the gripper assembly 10 and a workpiece holder. Gripper assembly 10 is pivotable about the central axes of cylinder 30 and the central axes of cylinder 44. Coupling means 26, therefore, gives 360° positioning in multi-planes.

With reference now to FIG. 4, coupling means 26 is there shown located at the top 28 of the gripper assembly 10. As the gripper assembly 10 and, correspondingly, the mounting spacer 16 are square in shape, the mounting spacer 16 with the coupling means 26, may be oriented on any side 22, 24 of the gripper assembly 10.

Figure 5:
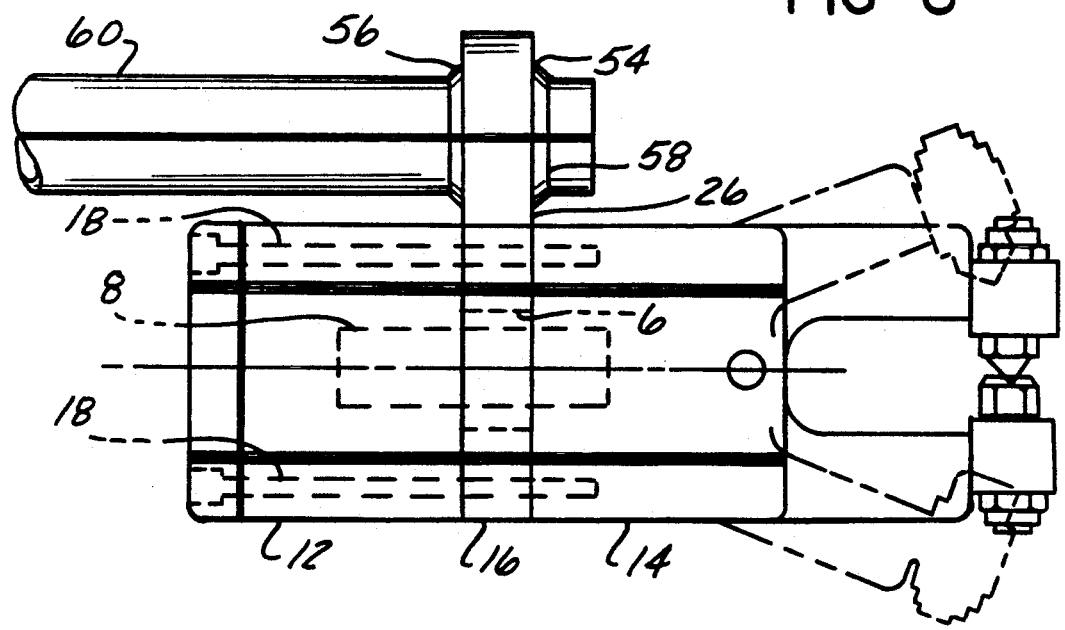
FIG. 5 is a side elevational view of a second preferred embodiment of a mounting unit on a gripper assembly embodying the present invention.

With reference now to FIG. 5, a second preferred piece rectangular member, in the form of a bearing block 54, is fixedly attached to the spacer 16 to define a second embodiment of the coupling means 26. Bearing block 54 has an aperture 56 which seats a spherical collar 58. Tube 60 extends through the collar 58 at one end and is seated in the workpiece holder (not shown) at its other end. Bolts 62 lock the bearing block 54 and, thus, the spherical collar 58 about tube 60. Gripper assembly 10 is rotatable about spherical collar 58 and may be positioned anywhere along the longitudinal axis of tube 60.

Figure 7:
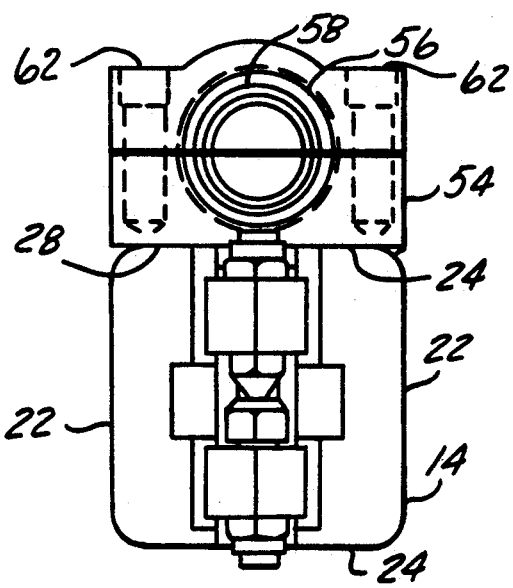
FIG. 7 is a rear plan view of the structure shown in FIG. 5.

With reference now to FIG. 7, the mounting spacer 16 is there shown in a position parallel with and on top 28 of the gripper assembly 10. Since spacer 16 is substantially square in shape, mounting spacer 16 with corresponding coupling means 26, may be oriented on any side 22, 24 of the gripper assembly 10.

Figure 10:
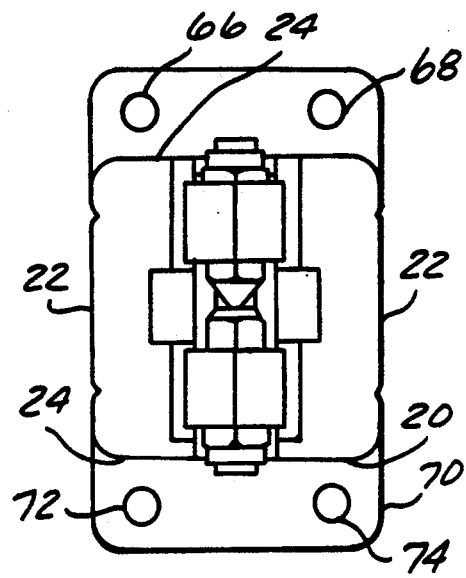
FIG. 10 is a rear plan view of the structure shown in FIG. 8.
Figure 8:
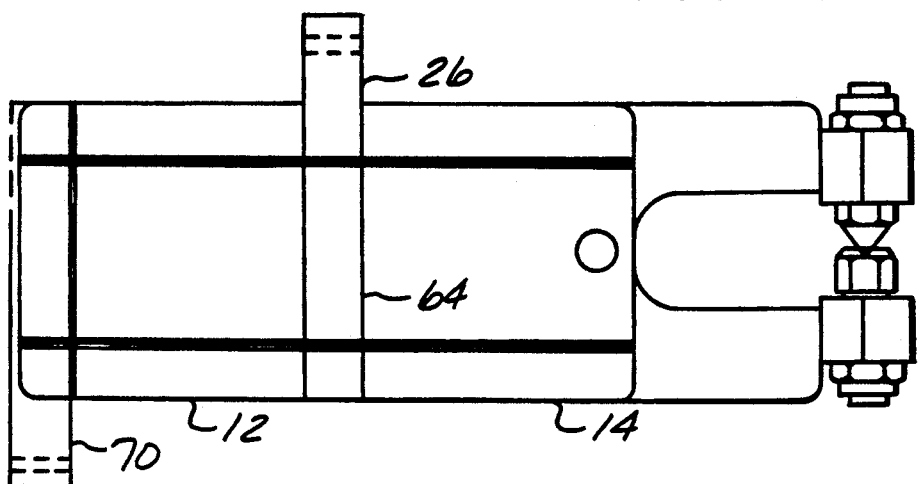
FIG. 8 is a side elevational view with a third preferred embodiment of a mounting unit on a gripper assembly embodying the present invention.
Figure 9:
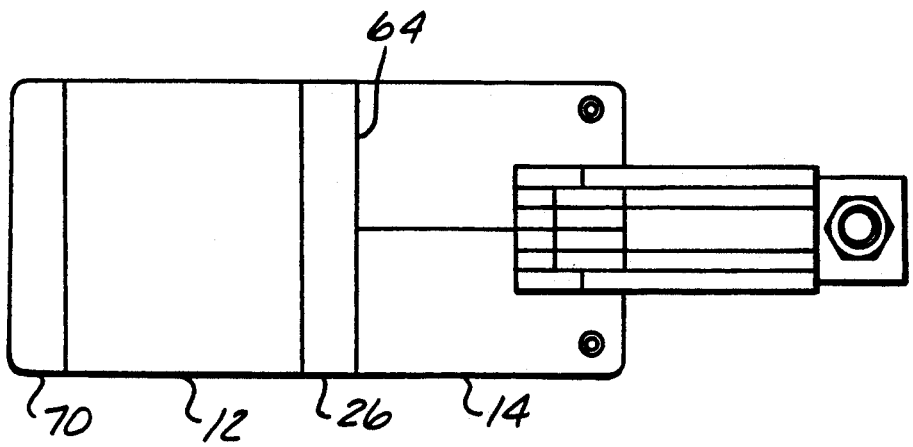
FIG. 9 is a top plan view of the structure shown in FIG. 8.

With reference now to FIGS. 8 through 10, a third preferred embodiment of coupling means 26 is there shown. Rectangular plate 64 having opposing pairs of apertures 66, 68 extend outwardly from mounting spacer 16. Plate 64 has apertures (not shown) corresponding to bolts 18 as in FIG. 1. Plate 64 may be located with apertures 66, 68 extending on the top 28 as shown or from any side 22, 24 of the gripper 10. A second rectangular plate 70, having opposing apertures 72, 74 extend outwardly from the bottom 20 of the actuator portion 12. Locking means, such as bolts (not shown), extend through apertures 66, 68, 72, 74 for mounting the gripper assembly 10 to a workpiece holder. Gripper assembly 10 is fixed in a desired position with the workpiece holder. Rectangular plates 64, 70 may be used simultaneously or individually as needed.

With reference to FIG. 10, the coupling element is there shown with apertures extending above and below gripper assembly 10. As mounting spacer 16 is substantially square, coupling means 26 may be rotated so that apertures 66, 68, for example, may extend from sides 22, 24 of the gripper assembly 10. In this way, gripper assembly 10 may be fixedly mounted to a workholder device about any side 22, 24.

Having described our invention, however, many modifications thereto will become apparent to those skilled in the art to which it pertains without deviation from the spirit of the invention as defined by the scope of the appended claims.

We claim:

1. A gripper assembly for gripping a workpiece for use with a support member comprising:
   a fluid operated actuator portion having a moveable driven member with a longitudinal axis;
   a workpiece gripper portion openable in response to movement of said driven member;
   removable means connectable to at least one of said actuator portion and said gripper portion, said removable means including a member having an aperture disposed therethrough for passage of said driven member from said actuator portion to said gripper portion, wherein said member is angularly orientatable in any one of a plurality of positions with respect to said actuator portion and said gripper portion about said longitudinal axis of said driven member; and
   means for mounting said gripper assembly to said support member, said mounting means fixedly attached directly to said removable means and including a radially extending member with respect to said longitudinal axis for connecting with said support member.

2. A gripper assembly for gripping a workpiece for use with a support member comprising:
   a fluid operated actuator portion having a moveable driven member with a longitudinal axis;
   a workpiece gripper portion operable in response to movement of said driven member;
   removable spacer means mounted between said actuator portion and said gripper portion, said spacer means including a member with opposing sides and having an aperture disposed therethrough for passage of said driven member from said actuator portion to said gripper portion, wherein said member is angularly orientatable in any one of a plurality of positions with respect to said actuator portion and said gripper portion about said longitudinal axis of said driven member, wherein said spacer means includes a square-shaped cross section; and
   means for mounting said gripper assembly to said support member, said mounting means fixedly attached to said spacer means and including a radially extending member with respect to said longitudinal axis for connecting with said support member.

3. The gripper assembly of claim 2, said mounting means further comprising:
   a first cylindrical member extending outwardly from said spacer means; and
   means for engaging said support member.

4. The gripper assembly of claim 3, said engaging means further comprising a substantially S-shaped bracket having opposing arms and a central leg extending between said arms, wherein one of said opposing arms is rotatably mounted to said first cylindrical member for pivoting of said gripper assembly about a central axis of said first cylindrical member.

5. The gripper assembly of claim 4, wherein the other of said opposing arms is rotatably mounted to said support member by mounting means, said mounting means including a second cylindrical member fixedly attached to said support member, wherein said gripper assembly is pivotable about a central axis of said second cylindrical member.

6. A gripper assembly for gripping a workpiece for use with a support member comprising:
   a fluid operated actuator portion having a moveable driven member;
   a workpiece gripper portion operable in response to movement of said driven member;
   removable spacer means mounted between said actuator portion and said gripper portion; and
   means for mounting said gripper assembly to said support member, said mounting means fixedly attached to said spacer means and including a substantially rectangular-shaped member having an aperture disposed therethrough.

7. The gripper assembly of claim 6, said spacer means further comprising a substantially rectangular-shaped member with opposing sides and having an aperture disposed therethrough for passage of said driven member from said another portion to said gripper portion, wherein said rectangular-shaped member is angularly orientatable with respect to said actuator portion and said gripper portion about said driven member.

8. The gripper assembly of claim 7 wherein said spacer means includes a square-shaped cross section.

9. The gripper assembly of claim 8, said mounting means further comprising:
   means for engaging said gripper assembly, said gripper engaging means including a substantially spherical member rotatably mounted within said rectangular-shaped member and having an aperture disposed therethrough, wherein said gripper assembly is rotatable about said spherical member;
   means for engaging said support member; and
   means for locking said gripper assembly in position about said spherical member.

10. The gripper assembly of claim 9, said support member engaging means further comprising a tubular member extending from said support member through said aperture.

11. The gripper assembly of claim 9, said locking means further comprising at least one bolt extending through said rectangular mounting means.

12. A gripper assembly for gripping a workpiece for use with a support member comprising:
   a fluid operated actuator portion having a driven member movable along a longitudinal axis;
   a workpiece gripper portion operable in response to movement of said driven member;
   removable means, connectable to said actuator portion, for supporting said actuator portion from said support member, said removable means having at least one peripheral edge extending axially with respect to said longitudinal axis and said one peripheral edge angularly orientatable in any one of a plurality of positions with respect to said actuator portion and said gripper portion about said longitudinal axis of said driven member;
   adjustable mounting means disposed along said at least one peripheral edge of said removable means and extending radially outwardly with respect to said longitudinal axis for connecting said removable means to said support member; and
   at least one elongated fastener means extending from the actuator portion through the removable means and into the gripper portion for connecting the actuator portion, removable means and gripper portion to one another in a desired angular orientation.

13. The gripper assembly of claim 12 wherein said adjustable mounting means further comprises:
   a first cylindrical member extending outwardly from said removable means; and
   means for engaging said first cylindrical member allowing adjustable angular orientation about said first cylindrical member and for connecting to said support member.

14. A gripper assembly for gripping a workpiece for use with a support member comprising:
   a fluid operated actuator portion having a driven member movable along a longitudinal axis;
   a workpiece gripper portion operable in response to movement of said driven member;
   removable means, connectable to said actuator portion, for supporting said actuator portion from said support member, said removable means having at least one peripheral edge extending axially with respect to said longitudinal axis; and
   adjustable mounting means disposed along said at least one peripheral edge of said removable means for connecting said removable means to said support member, wherein said adjustable mounting means includes a first flange member extending outwardly from said removable means, and means for engaging said first flange member and for connecting to said support member.

15. The gripper assembly of claim 14 wherein said engaging means further comprising:
   said support member including an elongated tube having a longitudinal axis; and
   split clamp means disposed on said first flange for engaging said elongated tube allowing axial displacement along said longitudinal axis of said elongated tube and angular displacement about said longitudinal axis.

16. The gripper assembly of claim 15 wherein said split clamp means further comprises:
   a spherical collar engagable with said elongated tube;
   a split clamp having a spherical zone surface defining an aperture engagable with said spherical collar; and
   bolt means for locking said split clamp around said spherical collar such that said spherical collar becomes fixed with respect to said elongated tube when said bolt means is tightened.

17. The gripper assembly of claim 14 wherein said engaging means further comprises:
   said first flange having at least one aperture; and
   bolt means passing through said at least one aperture for connecting to said support member.

18. A gripper assembly for gripping a workpiece for use with a support member comprising:
   a fluid operated actuator portion having a movable driven member;
   a workpiece gripper portion operable in response to movement of said driven member;
   removable spacer means mounted between said actuator portion and said gripper portion; and
   means for mounting said gripper assembly to said support member, said mounting means fixedly attached directly to said spacer means and including a member having an aperture disposed therethrough.

19. A gripper assembly for gripping a workpiece for use with a support member comprising:

a fluid operated actuator portion having a driven member movable along a longitudinal axis;

a workpiece gripper portion operable in response to movement of said driven member;

removable means, engageable with at least one of said actuator portion and said gripper portion, for supporting said one portion from said support member, said removable means movable into a selectable one of a plurality of angular positions with respect to said at least one portion;

means for releasably securing said removable means in said selected one angular position; and means for connecting said removable means to said support member, said connecting means having an aperture defining at least a partial spherical zone for connecting to said support member.

* * * * *

UNITED STATES PATENT AND TRADEMARK OFFICE
CERTIFICATE OF CORRECTION

PATENT NO. : 5,299,847
DATED : April 5, 1994
INVENTOR(S) : John A. Blatt and David C. Tomlin It is certified that error appears in the above-indentified patent and that said Letters Patent is hereby corrected as shown below:

Column 2, line 63, please delete "o" and insert --on--.

Column 3, line 27, after "preferred" please insert --embodiment of the mounting spacer 16 is there shown. A multi---.

Column 5, line 22, please delete "another" and insert --actuator--.

Signed and Sealed this

Twenty-seventh Day of September, 1994

Attest:

BRUCE LEHMAN

Attesting Officer        Commissioner of Patents and Trademarks